July 17, 1956 P. GROUARD ET AL 2,755,148
SUPPORTING DEVICE FOR A SHAFT OF A CENTRIFUGAL APPARATUS
Filed June 4, 1952 2 Sheets-Sheet 1
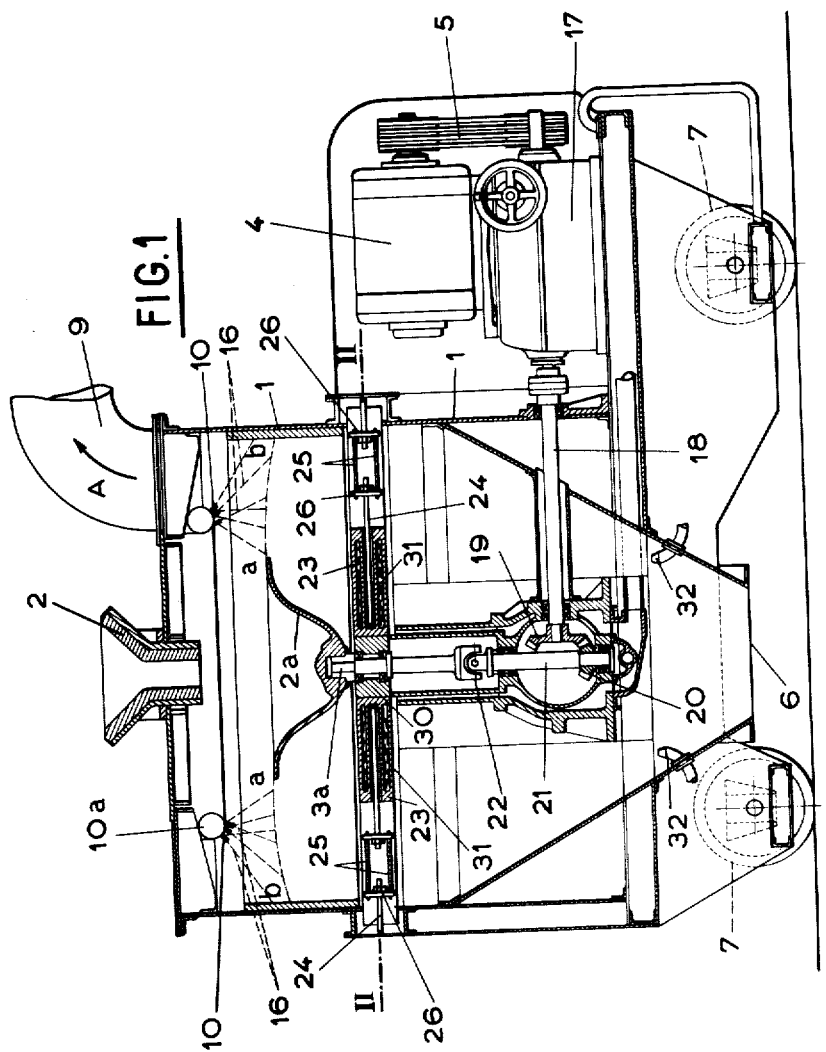
INVENTORS
PIERRE GROUARD
MAURICE COURTIERE
BY:
Haseltine, Lake & Co.
AGENTS

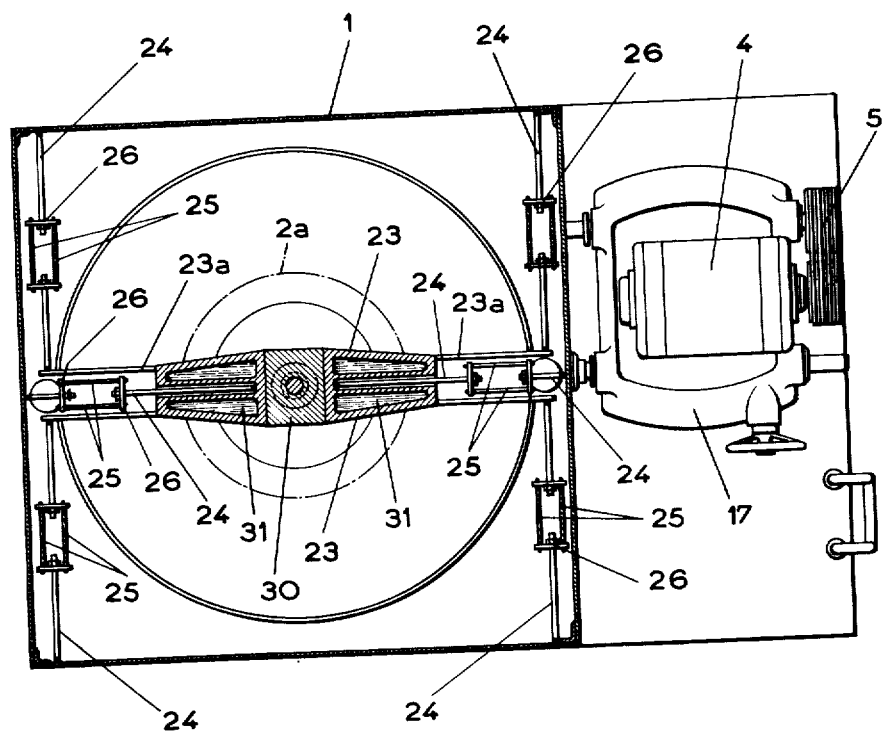

United States Patent Office 2,755,148
Patented July 17, 1956

2,755,148

SUPPORTING DEVICE FOR A SHAFT OF A CENTRIFUGAL APPARATUS

Pierre Grouard and Maurice Courtiere, Versailles, France

Application June 4, 1952, Serial No. 291,768

Claims priority, application France February 2, 1952

1 Claim. (Cl. 308—146)

For providing very divided ground particles of drosses, scorias, slags and similar products it is advantageous to granulate previously the products as the direct grinding of the cooled products is a relatively expensive operation which comes up against various difficulties.

The present invention relates to apparatus to facilitate the manufacture, from liquid matters (drosses, scorias, slags, etc.) and preferably at their pouring from the apparatus in which they were produced, a product consisting of small granules which are easy to store and handle before the final grinding, said grinding being performed subsequently under the most favourable conditions.

The invention is concerned more particularly with apparatus of the type in which the aforementioned liquid matter is distributed through a chute on an element having the shape of a cup or an inverted bell and revolving at a high speed and is submitted to the influence of a cooling medium.

The present invention has for its main object the purpose of providing means applicable to apparatus of the above mentioned type, for the purpose of self-centering a rotative element. The product to be granulated falls onto the rotative element. The self-centering means includes a flexible suspension with non-linear return allowing to the apparatus to support the important wants of balance which may take place during its functioning without transmitting vibrations to the frame or stand of the apparatus.

The aforesaid and other objects, features and advantages of the invention will be more easily and fully understood from the illustration of one embodiment of a granulation apparatus comprising the self-centering means according to the invention, being understood that the invention is not restricted to the details of the illustrated and described embodiment but that is susceptible to modifications and adaptations.

In the attached drawings:

Fig. 1 is a vertical axial section of the whole apparatus for granulating liquid drosses, scorias, slags and similar products, comprising the means according to this invention.

Fig. 2 is a plan view partly in section along II—II of Fig. 1, the casing of the driving motor being suppressed.

In the improved apparatus according to the present invention which may form a movable unit mounted on wheels 7, the revolving element 2a, on which the molten product to be granulated is delivered from a chute 2, has the shape of a cup or inverted bell and revolves at high speed around the vertical geometrical axis of a rotating shaft 3a. Preferably the cup is lined on the inside surface thereof either with a brickwork or a coating of fire-proof cement (not shown), this lining having for an object to protect the structure of the system.

It is essential, on the one hand, for obtaining small granules and a good running of the apparatus, that the matter to be granulated be uniformly distributed under the influence of the centrifugal force produced by the rapid rotation of cup 2a on the inside surface thereof.

On the other hand, the thickness of the layer of the centrifuged matter (thickness which is substantial near the axis of revolution) decreases rapidly when the distance to the axis of revolution increases. The rate of decrease of said thickness depends on the shape of said cup 2a; said shape is designed so as to provide a distribution of the matter without any slipping or cavitation of said matter on the inside surface of said cup. This advantage is obtained by maintaining constant, up to the lip of said cup, the mean acceleration of the particles of said matter; further the shape of said lip is chosen so as to prevent said matter from being torn away due to the centrifugal force. The curvature of said lip is chosen so as to be inferior to a maximum value determined by the characteristics of the matter to be granulated (taking into account the chosen speed of revolution).

In its upward way along the surface of the cup 2a, said matter constitutes a very thin uniform coating which leaves finally the periphery of said cup and forms a liquid sheet which is ejected, at a high linear speed, along the line ab (Fig. 1). At a small distance from the lip of the cup, the line ab is broken due to the resistance and turbulence of the air, upwardly injected through the pipes 32, in numerous and very minute particles which are ejected towards the casing 1 of the apparatus and meet jets 16 of very finely divided particles of water ejected in the granulation zone by nozzles 10 provided on the water feeding ring 10a. The solidification of the particles and the resulting violent ejection of steam (discharged through pipe 9 as shown by arrow A) produce the bursting of said particles and the formation of the desired granules.

The rotation of the cup 2a for centrifugally discharging product along the line a—b is driven by a motor 4, the movement thereof being transmitted to the shaft 3a through belts 5, a change-speed gear 17, a shaft 18, bevel-gears 19 and 20, a shaft 21 and a universal joint 22.

In practice it is essential, for a correct running of the apparatus, that a very stable or balanced movement of cup 2a be ensured under a load which varies sometimes abruptly. It is not possible to utilize a rigid device for supporting the shaft 3a of said cup and, according to another feature of the invention, an assembly is provided which gives extreme flexibility of said cup around the equilibrium position thereof so that said cup may undergo substantial imbalance without transmitting any vibrations to the stationary portion of the apparatus.

The device used in the illustrated exemplary embodiment provides a gyroscopic self-centering device, with a non-linear resilient return means. This arrangement provides many advantages for the safe and the correct running of the apparatus. The amplitudes, even in the cases of extreme resonance, are limited without the use of devices providing an energy dissipation. The small deviations around the equilibrium position resulting from the flowing irregularities of the liquid matter on the cup will not be perceptible except on the suspension of said cup and they will contribute to improve the distribution of the fluid mass. This is a very important feature for a correct running of the centrifugal cup 2a.

The centre of gravity of the whole assembly is situated vertically above the universal joint 22 of the rotating system. The cup 2a is statically stabilized by means of a resilient suspension comprising six braces connecting the stationary casing 1 of the apparatus to the housing 23 of the bearing 30 in which revolves the shaft 3a of the cup.

Each brace comprises a pair of rigid stay-bars 24, one brace in each pair having its outer extremity secured to the housing 23 (or an extension 23a thereof), the other brace in said pair having its outer extremity secured to the casing 1 and the two stay-bars in each pair being connected together at their inner extremities by means of a resilient element comprising cables 25 stretched between two plates 26, each one of said plates being secured to one of the stay-bars 24.

The two stay-bars 24 which are the nearest to the shaft 3a penetrate inside the housing 23; said stand comprises water-jackets or water-chambers 31 around the stay-bars 24 for providing a water circulation ensuring the protection of said stay-bars against the possible variations of temperature.

The afore-mentioned suspension device provides a resilient return means (owing to the elements 25 and 26) substantially linear in the region of the small amplitudes which corresponds to the normal running; beyond said region the return forces increase quickly and the suspension is endowed with a non-linear characteristic. The stabilization of the rotating cup 2a is thereby promoted throughout the whole range of speeds, including the slow speeds. At rest, the apparatus constitutes a rigid assembly which is light in weight and strongly built, promoting the transportation, handling and keeping thereof.

During running, the lack of vibrations due to the self-stabilizing qualities of the suspension minimizes the strains, thereby increasing the resistance of the mechanical elements.

The formed granules are collected at the bottom 6 of the apparatus on a conveyor (not shown) which carries said granules to the storage chambers.

The apparatus just described is particularly adapted for the granulation of basic slag from Thomas converters which is utilized as fertilizer and which has to be ground very thoroughly for this utilization. But the apparatus may also be used for the granulation of other products e. g. other slags and scorias.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claim.

What we claim is:

A device for supporting and stabilizing the cup-shaped rotating member of a centrifugal apparatus for the granulation of scorias, slags and similar products, said device comprising a frame, a drive means for rotating said member at high speed, a transmission connecting said drive means and including a universal joint and a vertical shaft adapted to be keyed to said member, a bearing surrounding said vertical shaft, a housing surrounding said bearing, means comprising pairs of stay-bars connecting said housing to said frame and a non-linear resilient return means for each pair of stay-bars comprising torsional cables stretched between two plates connected respectively to the two stay-bars of said pair, and means cooling at least some of said stay-bars.

References Cited in the file of this patent
UNITED STATES PATENTS

| | | |
|---|---|---|
| 695,158 | Lafferty | Mar. 11, 1902 |
| 1,210,097 | Perry et al. | Dec. 26, 1916 |
| 1,224,815 | Walters | May 1, 1917 |
| 1,601,897 | Wiley et al. | Oct. 5, 1926 |
| 2,414,788 | Altorfer | Jan. 28, 1947 |
| 2,439,772 | Gow | Apr. 13, 1948 |

Dedication 2,755,148.—*Pierre Grouard* and *Maurice Courtiere*, Versailles, France. SUPPORTING DEVICE FOR A SHAFT OF A CENTRIFUGAL APPARATUS. Patent dated July 17, 1956. Dedication filed Nov. 27, 1972, by the assignee, *Societe Siderurgique de Granulation*, assenting.

Hereby dedicates to the Public the portion of the term of the patent subsequent to July 17, 1973.

[*Official Gazette February 20, 1973.*]